(12) United States Patent
St. Jacques, Jr. et al.

(10) Patent No.: US 8,854,675 B1
(45) Date of Patent: Oct. 7, 2014

(54) ELECTRONIC DOCUMENT PROCESSING METHOD AND DEVICE

(71) Applicant: XEROX Corporation, Norwalk, CT (US)

(72) Inventors: Robert St. Jacques, Jr., Fairport, NY (US); Steven R. Moore, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 22 days.

(21) Appl. No.: 13/852,064

(22) Filed: Mar. 28, 2013

(51) Int. Cl.
*G06F 3/12* (2006.01)
*G06F 15/00* (2006.01)
*G06K 15/00* (2006.01)
*H04N 1/04* (2006.01)
*B65H 31/04* (2006.01)
*G06F 17/00* (2006.01)
*G06K 9/00* (2006.01)
*H04N 1/23* (2006.01)

(52) U.S. Cl.
CPC ...................................... *H04N 1/23* (2013.01)
USPC ........... 358/1.15; 358/1.18; 358/1.1; 358/1.9; 358/1.14; 358/474; 271/213; 715/273; 715/243; 715/251; 382/112

(58) Field of Classification Search
USPC ................ 358/1.15, 1.18, 1.1, 1.9, 1.14, 474; 271/213; 715/273, 243, 251; 382/112
See application file for complete search history.

(56) References Cited

U.S. PATENT DOCUMENTS

| | | | |
|---|---|---|---|
| 6,032,004 A | 2/2000 | Mirabella, Jr. et al. | |
| 6,438,584 B1 | 8/2002 | Powers | |
| 6,502,812 B2 | 1/2003 | Belec | |
| 6,604,132 B1 | 8/2003 | Hitt | |
| 6,996,276 B2 | 2/2006 | Liu et al. | |
| 7,010,144 B1 | 3/2006 | Davis et al. | |
| 7,154,622 B2 | 12/2006 | Constantin | |
| 7,190,480 B2 | 3/2007 | Sturgeon et al. | |
| 7,580,164 B2 * | 8/2009 | Barrus et al. | 358/474 |
| 7,693,942 B2 | 4/2010 | Nale | |
| 8,125,689 B2 | 2/2012 | Morita et al. | |
| 8,301,611 B2 | 10/2012 | Schneider | |
| 8,305,632 B2 | 11/2012 | Johnson et al. | |
| 2003/0101199 A1 | 5/2003 | Briggi | |
| 2004/0208371 A1 | 10/2004 | Liu et al. | |
| 2005/0060650 A1 * | 3/2005 | Ryan et al. | 715/526 |

(Continued)

OTHER PUBLICATIONS

Kulkarni, et al., U.S. Appl. No. 13/761,737, filed Feb. 7, 2013.

*Primary Examiner* — Charlotte M Baker
*Assistant Examiner* — Rury Grisham
(74) *Attorney, Agent, or Firm* — Gibb & Riley, LLC

(57) ABSTRACT

In the method and device, electronic documents are created from a batch of physical documents of varying lengths. The batch comprises sub-batches of groups of multiple multi-page physical documents with separator sheets on each group. Each separator sheet is marked with a page count for any physical documents in its group. The batch is scanned-in and the resulting image pages are used to form the electronic documents. Specifically, the image pages are analyzed in sequence to identify document sheet image pages and separator sheet image pages. When a separator sheet image page is identified, the page count on that separator sheet image page is read and electronic document(s) is/are created from sequential set(s) of document sheet image pages, which follow the separator sheet image page and have the specific page count, until the next separator sheet image page is identified. This is repeated for all separator sheet image pages identified.

24 Claims, 11 Drawing Sheets

(56) References Cited

U.S. PATENT DOCUMENTS

| | | | |
|---|---|---|---|
| 2005/0185220 A1* | 8/2005 | Martinez | 358/1.18 |
| 2006/0056660 A1* | 3/2006 | Tojo | 382/112 |
| 2006/0136450 A1 | 6/2006 | Barrus et al. | |
| 2006/0262340 A1* | 11/2006 | Lee | 358/1.14 |
| 2007/0177164 A1* | 8/2007 | Ahmad | 358/1.1 |
| 2008/0165379 A1* | 7/2008 | Zuber | 358/1.9 |
| 2009/0080030 A1 | 3/2009 | Jiang et al. | |
| 2009/0160123 A1* | 6/2009 | Jones | 271/213 |
| 2009/0201530 A1* | 8/2009 | Bustamante | 358/1.15 |
| 2010/0141985 A1* | 6/2010 | Noy et al. | 358/1.15 |
| 2011/0192894 A1 | 8/2011 | Ragnet et al. | |
| 2012/0062939 A1* | 3/2012 | Miyazaki | 358/1.15 |
| 2012/0110953 A1 | 5/2012 | Arnoux | |
| 2012/0147423 A1* | 6/2012 | Matsuba | 358/1.15 |
| 2012/0200875 A1* | 8/2012 | Kodimer | 358/1.13 |
| 2012/0246560 A1* | 9/2012 | Greenfield et al. | 715/251 |
| 2013/0191730 A1* | 7/2013 | Carlen et al. | 715/243 |

* cited by examiner

ELECTRONIC DOCUMENT PROCESSING METHOD AND DEVICE

BACKGROUND

The method and device disclosed herein generally relate to electronic document processing and, more particularly, to automatically creating multiple electronic documents from a scanned-in batch of physical documents having varying lengths (i.e., varying page counts).

Many workflows exist in which large numbers of physical documents (i.e., hardcopies of documents) must be digitized. That is, the physical documents must be scanned-in using an optical scanner in order to create electronic documents (i.e., digitized documents, softcopies, etc.) corresponding to the physical documents. These electronic documents can then be transmitted to an electronic records system, where they are further stored and/or processed. However, when the lengths of the physical documents vary (i.e., when the physical documents have different page counts), digitization of the physical documents can be a difficult and time-consuming task. Specifically, when varying-length physical documents are scanned-in in a batch, back end electronic document processing must be manually performed in order to separate out the electronic documents that correspond to the physical documents. Otherwise, such varying-length physical documents must be scanned-in individually.

SUMMARY

In view of the foregoing disclosed herein is an electronic documents processing method wherein electronic documents are automatically created from a batch of physical documents of varying lengths. Specifically, the batch comprises sub-batches of groups of multiple multi-page physical documents of varying lengths with separator sheets on each group. Each separator sheet is marked with the page count of any physical documents contained in its group. The batch is scanned-in and the resulting image pages are used to form the electronic documents. Specifically, the image pages are analyzed in sequence to identify document sheet image pages and separator sheet image pages. When a separator sheet image page is identified, the specific page count on that separator sheet image page is read and electronic document(s) is/are created from sequential set(s) of document sheet image pages, which follow the separator sheet image page and have the specific page count, until the next separator sheet image page is identified. This is repeated for all separator sheet image pages identified. Also disclosed herein is an electronic documents processing device.

More particularly, disclosed herein is a method for electronic document processing.

Prior to any electronic document processing according to the method, a batch of media sheets can be formed by a user. This batch can be formed such that it comprises a plurality of sub-batches. The sub-batches can comprise groups of physical documents comprising document sheets, wherein some or all of the groups comprise multiple multi-page physical documents and the multiple multi-page physical documents in any given group each have the same page count (i.e., the same length). The sub-batches can also comprise separator sheets on top of the groups and these separator sheets can have markings indicating the page counts associated with the groups. That is, each separator sheet can have a marking indicating the page count of any physical documents contained in its group. The markings on the separator sheets can be handwritten or pre-printed. Optionally, the markings can be in the form of barcodes. Also, optionally, no groups will have the same corresponding page count (i.e., no two groups will contain physical documents of the same length) such that the page counts marked on the different separator sheets will all be different. In any case, this batch can then be scanned-in (e.g., by the user using an optical scanner with a single page template) to produce multiple image pages. Since the media sheets within the batch comprise both the document sheets from the varying-length physical documents contained in the groups as well as the separator sheets on top of the groups, these image pages will comprise both document sheet image pages corresponding to the document sheets of the physical documents and separator sheet image pages corresponding to the separator sheets.

In the method, the multiple image pages can be received (e.g., by an electronic documents processor) and used to form multiple electronic documents corresponding to all of the varying-length physical documents in the batch.

Specifically, to form the electronic documents corresponding to the varying-length physical documents in the batch, the method can comprise analyzing each of the multiple image pages in sequence (e.g., as the multiple image pages are received by the electronic documents processor) in order to identify the image pages by type. That is, the image pages can be analyzed in sequence to identify each image page as either a separator sheet image page or a document sheet image page. Additionally, as the image pages are being analyzed in sequence, the following processes can be performed. When a separator sheet image page is identified, the specific page count can be read from a marking (e.g., from a barcode) on the separator sheet image page. Then, electronic document(s) having that specific page count can be created from each sequential set of document sheet image pages, which follow the separator sheet image page and similarly have the specific page count. The process of creating electronic document(s) with the specific page count from set(s) of document sheet image pages that follow a separator sheet image page can be performed until a subsequent separator sheet image page is identified (i.e., until the next separator sheet image page is identified). Then, the processes of reading the specific page count and creating electronic document(s) with that specific page count can be repeated for the subsequent separator sheet image page and for each subsequent separator sheet image page identified thereafter (i.e., for all separator sheet image pages identified).

The method can further comprise communicating the multiple electronic documents (e.g., as they are created or subsequently) to an electronic records system for storage and/or further processing. For example, when the electronic documents processor is incorporated into a computerized device that is on the same network as the electronic records system, the process of communicating the multiple electronic documents can be performed automatically over that same network as the multiple electronic documents are created, thereby avoiding any proprietary changes in the code used by the electronic records system. Alternatively, when the electronic documents processor is incorporated into a computerized device that is not on the same network as the electronic records system, the multiple electronic documents can initially be stored in a memory of the computerized device. Subsequently, a polling request for any new electronic documents can be received by the computerized device from a software agent of the electronic records system. Once the polling request is received, the software agent can be allowed by the computerized device to download the multiple electronic documents from the memory to the electronic records system, thereby also avoiding any proprietary changes in the code used by the electronic records system.

Also disclosed herein is a computerized device for electronic document processing.

Prior to any electronic document processing by this computerized device, a batch of media sheets can be formed by user. This batch can be formed such that it comprises a plurality of sub-batches. The sub-batches can comprise groups of physical documents comprising document sheets, wherein some or all of the groups comprise multiple multi-page physical documents and the multiple multi-page physical documents in any given group each have the same page count (i.e., the same length). The sub-batches can also comprise separator sheets on top of the groups and these separator sheets can have markings indicating the page counts associated with the groups. That is, each separator sheet can have a marking indicating the page count of any physical documents contained in its group. The markings on the separator sheets can be handwritten or pre-printed. Optionally, the markings can be in the form of barcodes. Also, optionally, no groups will have the same corresponding page count (i.e., no two groups will contain physical documents of the same length) such that the page counts marked on the different separator sheets will all be different. In any case, this batch can be scanned-in (e.g., by the user using an optical scanner with a single page template) to produce multiple image pages. Since the media sheets within the batch comprise both the document sheets from the varying-length physical documents contained in the groups as well as the separator sheets on top of each group, the image pages will comprise both document sheet image pages corresponding to the document sheets of the physical documents and separator sheet image pages corresponding to the separator sheets.

The computerized device can comprise at least an input, an output, a memory and an electronic documents processor operatively connected to the input, output and memory (e.g., over a system bus).

The input can receive the multiple image pages in sequence (i.e., in the sequence within which they were scanned-in) and the electronic documents processor can use these multiple image pages to form multiple electronic documents corresponding to all the varying-length physical documents in the batch.

Specifically, the electronic documents processor can analyze the multiple image pages in sequence (e.g., as the multiple image pages are received at the input) in order to identify the image pages by type. That is, the electronic documents processor can analyze the multiple image pages in sequence to identify each image page as either a separator sheet image page or a document sheet image page.

The electronic documents processor can further perform the following processes as it analyzes the multiple image pages in sequence. When a separator sheet image page is identified, the electronic documents processor can read the specific page count can from a marking (e.g., from a barcode) on that separator sheet image page. Then, the electronic documents processor can create electronic document(s) having the specific page count from each sequential set of document sheet image pages, which follow the separator sheet image page and similarly have that specific page count. The electronic documents processor can continue to create electronic document(s) with the specific page count from set(s) of document sheet image pages that follow a separator sheet image page until it identifies the next separator sheet image page (i.e., a subsequent separator sheet image page). The electronic documents processor can repeat the processes of reading the specific page count and creating electronic document(s) with that specific page count for the subsequent separator sheet image page and for each subsequent separator sheet image page identified thereafter (i.e., for all separator sheet image pages identified).

The output can communicate the multiple electronic documents to an electronic records system for storage and/or further processing (e.g., as the multiple electronic documents are created or subsequently). For example, the computerized device can be on (i.e., connected to) the same network as the electronic records system. In this case, the multiple electronic documents can be automatically communicated over that same network to the electronic records system as they are created, thereby avoiding any proprietary changes in the code used by the electronic records system. Alternatively, the computerized device can be on a different network than the electronic records system. In this case, the electronic documents processor can store the multiple electronic documents in the memory as they are created. Subsequently, the computerized device can receive a polling request for any new electronic documents from a software agent of the electronic records system. Once the polling request is received, the computerized device can allow the software agent to download the multiple electronic documents from the memory to the electronic records system, thereby also avoiding any proprietary changes in the code used by the electronic records system.

These and other features are described in, or are apparent from, the following detailed description.

BRIEF DESCRIPTION OF THE DRAWINGS

Various exemplary methods and devices are described in detail below, with reference to the attached drawing figures, in which.

DETAILED DESCRIPTION

Figure 1:
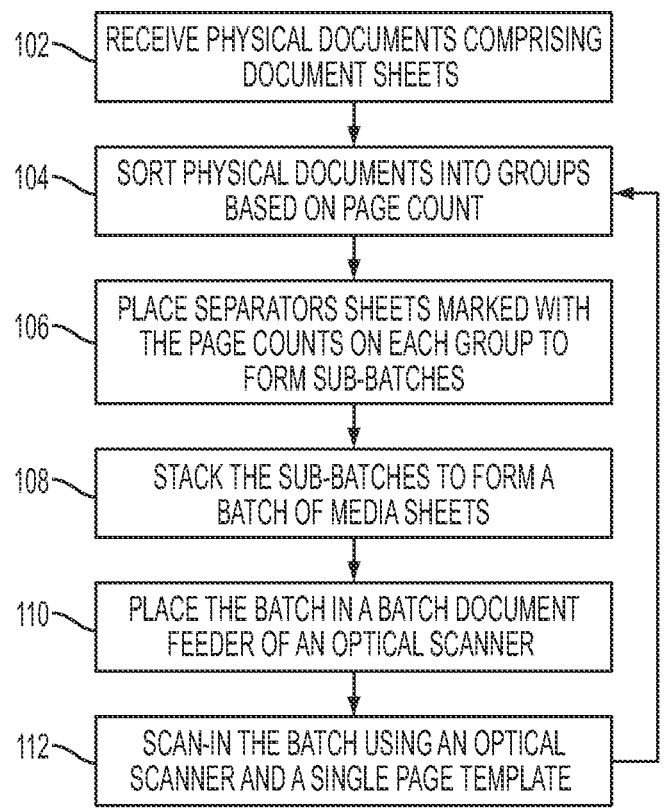
FIG. 1 is a flow diagram illustrating a method for scanning-in a batch of varying-length physical documents.

As mentioned above, many workflows exist in which large numbers of physical documents (i.e., hardcopies of documents) must be digitized. That is, the physical documents must be scanned using an optical scanner in order to create electronic documents (i.e., digitized documents, softcopies, etc.) corresponding to the physical documents. These electronic documents can then be transmitted to an electronic records system, where they are further stored and/or processed. However, when the lengths of the physical documents vary (i.e., when the physical documents have different page counts), digitization of the physical documents can be a difficult and time-consuming task. Specifically, when varying-length physical documents are scanned-in in a batch, back end electronic document processing must be manually performed to separate out the electronic documents that correspond to the physical documents. Otherwise, such varying-length physical documents must be scanned-in individually.

More specifically, many businesses handle large amounts of physical documents that must be digitized and communicated to electronic records system for storage and/or processing. For example, healthcare businesses typically receive large amounts of physical documents by mail from payers, labs, specialists, other clinics, patients, etc. This mail must be opened and the physical documents must be digitized and communicated to an Electronic Medical Records (EMR) system and/or an Electronic Health Records (EHR) system for storage in an electronic record associated with a specific patient. While all EMR/EHR systems provide some support for receiving scanned-in electronic documents, the support for processing batch jobs varies widely across such EMR/EHR systems.

Unfortunately, while some EMR/EHR systems provide users (e.g., records system administrators) with back end options for manually dividing a single multi-page electronic document into multiple electronic documents and/or manually combining multiple single-page electronic documents into multi-page electronic documents, other EMR/EHR systems do not. In this case, front end scanning of the physical documents becomes more cumbersome because all electronic documents communicated to the EMR/EHR systems must already correspond to specific physical documents. Specifically, physical documents must be scanned-in one at a time by an optical scanner, requiring a document manager employed by the healthcare business to spend a significant amount of time sorting and scanning the physical documents.

An exemplary workflow for the document manager in this case comprises sorting the physical documents such that any single-page documents are placed in one stack, any multi-page physical documents are placed in another stack and alternate documents are rotated 90° within the multi-page physical documents stack so that the document manager can easily separate them later. Next, the single-page document stack is placed in the document feeder of an optical scanner and scanned-in as a batch using a single-page network scan template. That is, each page in the single-page document stack is automatically fed by the document feeder through the optical scanner, scanned-in and saved as a single single-page electronic document, such as a TIFF document or PDF document, and then transmitted to the an EMR or EHR system. Additionally, each multi-page document is scanned-in individually. Specifically, a first multi-page document is manually pulled off of the multi-page document stack and placed in the document feeder of an optical scanner. Each page in the multi-page document is automatically fed by the document feeder through the optical scanner, scanned-in using an appropriate multi-page network scan template (given the document page count) and saved as a single multi-page electronic document, such as a TIFF document or PDF document, and then transmitted to an EMR or EHR system. This workflow is repeated until no more multi-page physical documents remain.

In view of the foregoing disclosed herein is an electronic documents processing method wherein electronic documents are automatically created from a batch of physical documents of varying lengths. Specifically, the batch comprises sub-batches of groups of multiple multi-page physical documents of varying lengths with separator sheets on each group. Each separator sheet is marked with the page count of any physical documents contained in its group. The batch is scanned-in and the resulting image pages are used to form the electronic documents. Specifically, the image pages are analyzed in sequence to identify document sheet image pages and separator sheet image pages. When a separator sheet image page is identified, the specific page count on that separator sheet image page is read and electronic document(s) is/are created from sequential set(s) of document sheet image pages, which follow the separator sheet image page and have the specific page count, until the next separator sheet image page is identified. This is repeated for all separator sheet image pages identified. Also disclosed herein is an electronic documents processing device.

More particularly, disclosed herein is a method and device for electronic document processing. In both the method and device preliminary processing of physical documents is initially performed to produce multiple image pages (also referred to herein as digital image pages or electronic image pages).

Specifically, referring to FIG. 1, in this preliminary processing physical documents each comprising one or more document sheets (e.g., sheets of paper) can be received (102). For example, in a typical office environment, a mail clerk can receive hardcopy mail, can open the hardcopy mail and can place the physical documents contained therein in the inbox of a document manager. The physical documents can then be sorted into groups (e.g., by the document manager) based on page count (i.e., based on document length) such that each group contains only physical documents having a specific page count (104).

Figure 2:
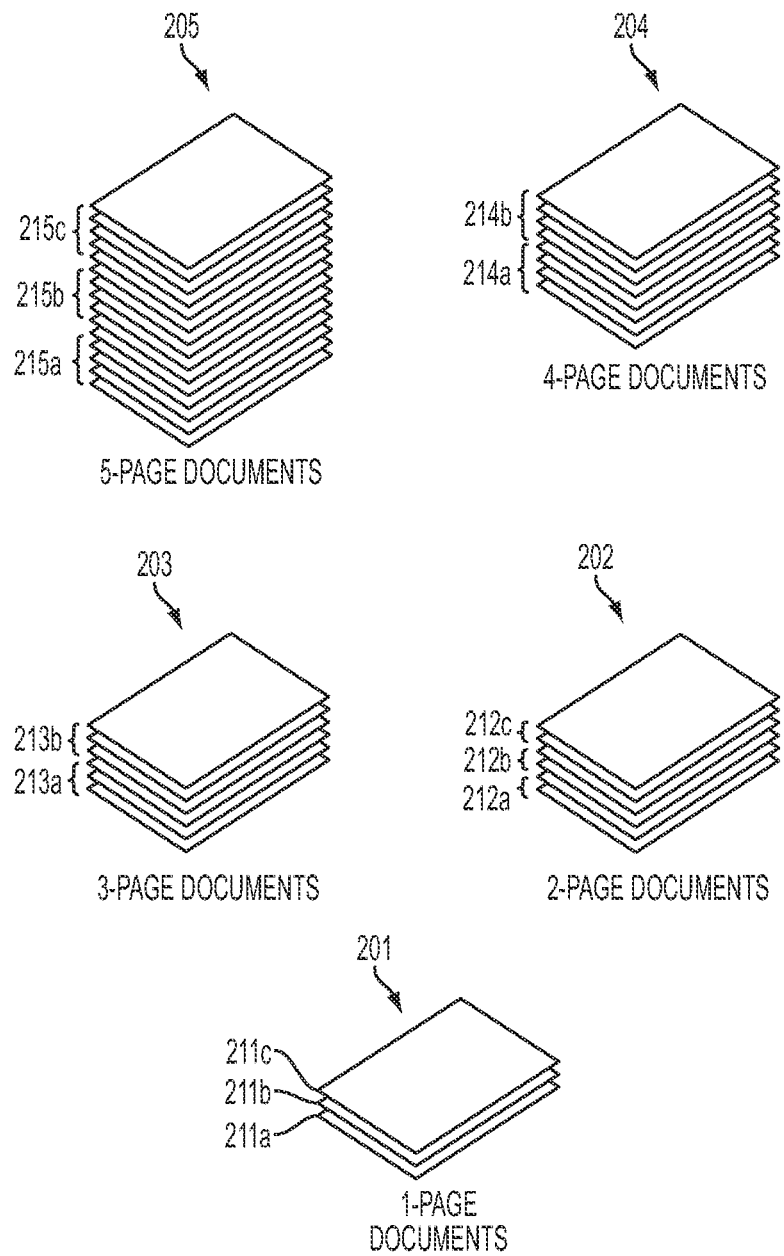
FIG. 2 is a diagram illustrating a process of sorting physical documents into groups according to page count.

For example, as illustrated in FIG. 2, at process 104 the physical documents can be sorted into a first group 201 of 1-page physical documents (e.g., see three 1-page physical documents 211a-c), a second group 202 of 2-page physical documents (e.g., see two 2-page physical documents 212a-c), a third group 203 of 3-page physical documents (e.g., see two 3-page physical documents 213a-b), a fourth group 204 of 4-page documents (e.g., see two 4-page physical documents 214a-b), a fifth group 205 of 5-page physical documents (e.g., see three 5-page physical documents 215a-c), etc. For illustration purposes, five groups 201-205 of physical documents are illustrated. However, it should be understood that the physical documents can be sorted into any number of groups as necessitated by the different lengths (i.e., different page counts) of the multi-page physical documents. Preferably the physical documents can be sorted into at groups 201-205 at process 104 such that no two groups have physical documents with the same number of pages. Furthermore, optionally, the first group 201 with 1-page documents can be segregated and processed separately such that the remaining groups 202-205 all contain at least one multi-page physical document. In any case, at least some or all of the groups 201-205 into which the physical documents are sorted will contain more than one multi-page physical document.

Referring again to FIG. 1, after the physical documents are sorted into the groups at process 104 as described above, separator sheets (also referred to as separators, divider sheets, dividers, slip sheets, inserts, etc.) can be placed on top of each of the groups to form sub-batches for a subsequent scanning-in process and these separator sheets can further have markings indicating the corresponding pages counts for the physical documents within the groups (106).

Figure 3:
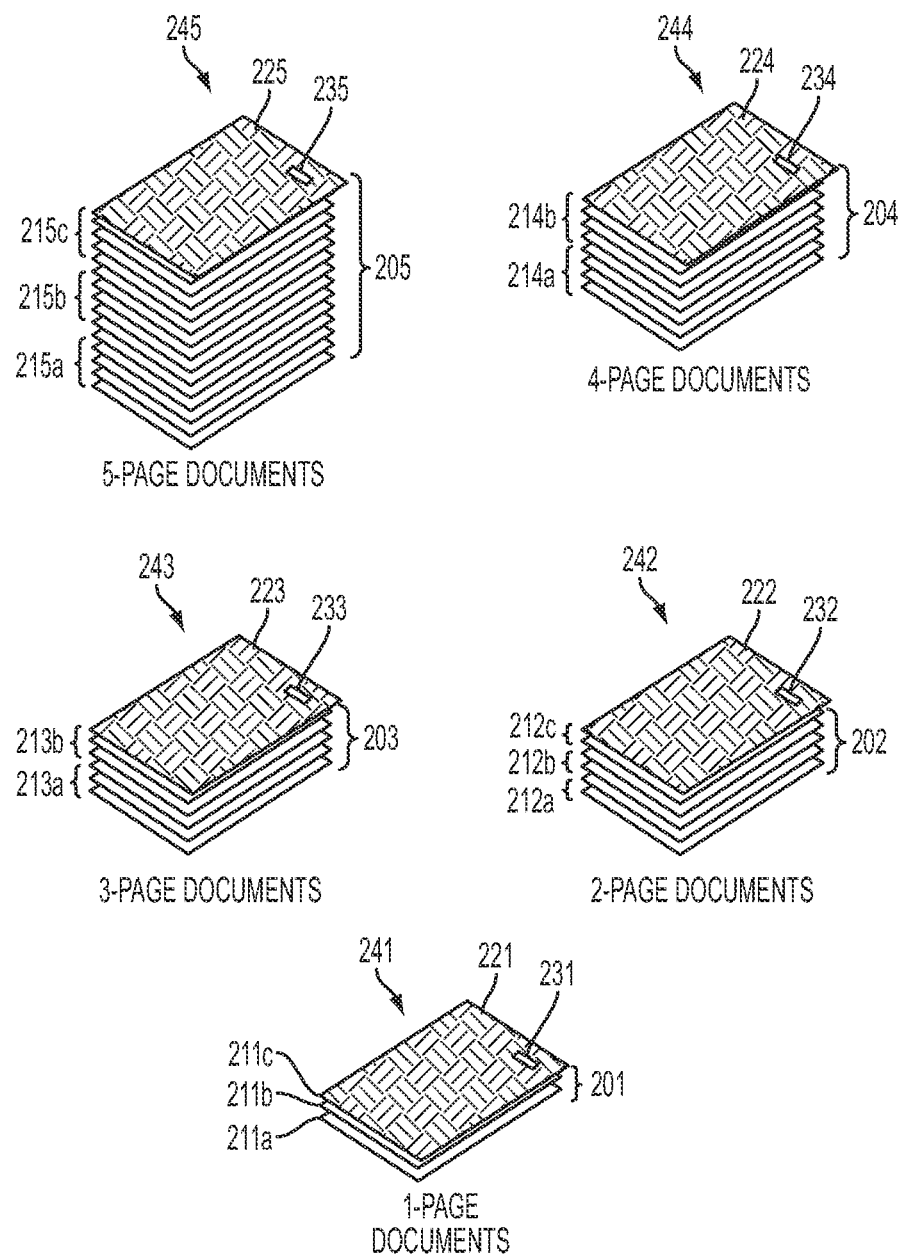
FIG. 3 is a diagram illustrating a process of placing separator sheets with page count markings on the groups of FIG. 2 to form sub-batches.

For example, as illustrated in FIG. 3, at process 106 separator sheets 221-225 can be placed on top of each of the groups 201-205 to form sub-batches 241-245, respectively. Each separator sheet 221-225 can have a marking 231-235 indicating the page count of any physical documents contained in its group 201-205. That is, a first separator sheet 221 on the first group 201 can have a first marking 231 indicating that all the documents contained therein are 1-page physical documents, a second separator sheet 222 on the second group 202 can have a second marking 232 indicating that all the documents contained therein are 2-page physical documents, a third separator sheet 223 on the third group 203 can have a third marking 233 indicating that all the documents contained therein are 3-page physical documents, a fourth separator sheet 224 on the fourth group 204 can have a fourth marking 234 indicating that all the documents contained therein are 4-page documents, a fifth separator sheet 225 on the fifth group 205 can have a fifth marking 235 indicating that all the documents contained therein are 5-page physical documents.

It should be noted that the markings 231-235 can be handwritten, typed, pre-printed, etc. The markings 231-235 can be in the form of text, which indicates the page counts (e.g., "1-page documents", "2-page documents", etc.) and which can subsequently be read, for example, by an optical character recognition (OCR) tool to determine the page counts (as discussed in greater detail below). Alternatively, the markings 231-235 can be in the form of coded images, such as barcodes (as illustrated), which indicate the page counts and which can subsequently be read, for example, by a barcode reader to determine the page counts (as discussed in greater detail below). Optionally, as mentioned above, none of the groups 201-205 will have the same corresponding page count (i.e., no two groups will contain physical documents of the same length) and, in this case, the page count marking 231-235 on the different separator sheets 221-225 will necessarily be different. Also, optionally, the separator sheets 221-225 can be marked with additional handwritten or pre-printed markings (not shown) identifying the separator sheets as such and/or the separator sheets 221-225 can be larger or smaller than the document sheets (i.e., the separator sheets and document sheets can have different sizes).

Figure 4:
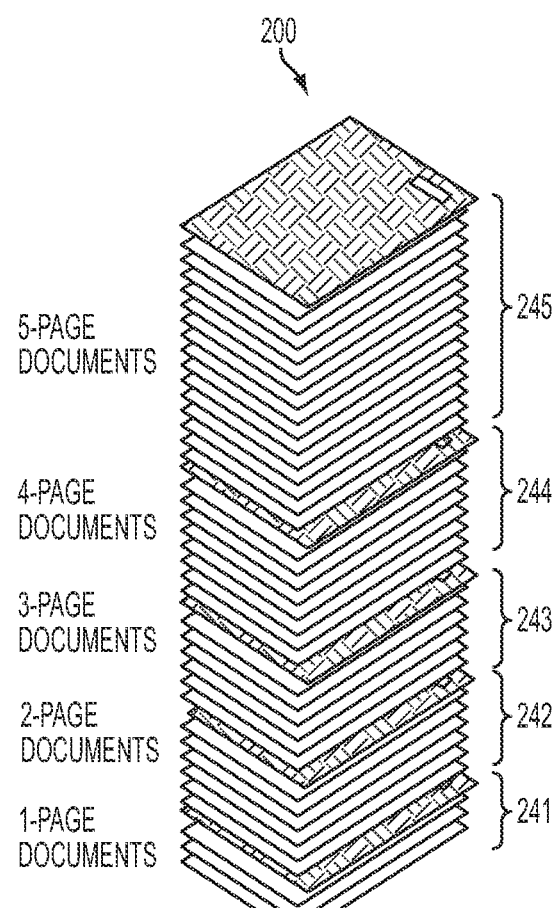
FIG. 4 is a diagram illustrating a process of stacking the sub-batches of FIG. 3 to form a batch.

Referring again to FIG. 1, after the sub-batches are formed at process 106 as described above, the sub-batches can be stacked to form a batch of media sheets, including the document sheets and separator sheets, as discussed above (108). For example, as illustrated in FIG. 4, the sub-batches 241-245 containing the groups 201-205 of physical documents with separator sheets 221-225 thereon can be stacked to form the batch 200. It should be noted that the batch 200 shown in FIG. 4 contains a sub-batch containing the first group 201 of 1-page physical documents. As mentioned above, optionally, this first group 201 may be processes separately such that it would not be contained within the batch 200 and such that only groups 202-205 with multi-page physical documents are contained within the group.

Once the batch 200 of media sheets is formed at process 108, it can be placed in the batch document feeder of an optical scanner and scanned-in using a single page template (110)-(112). Specifically, the batch 200 of media sheets, as described in detail above and illustrated in FIG. 4, can be scanned-in at process 112 using any computerized scanning device that incorporates or is operatively connected to an optical scanner having a batch document feeder.

Figure 5:
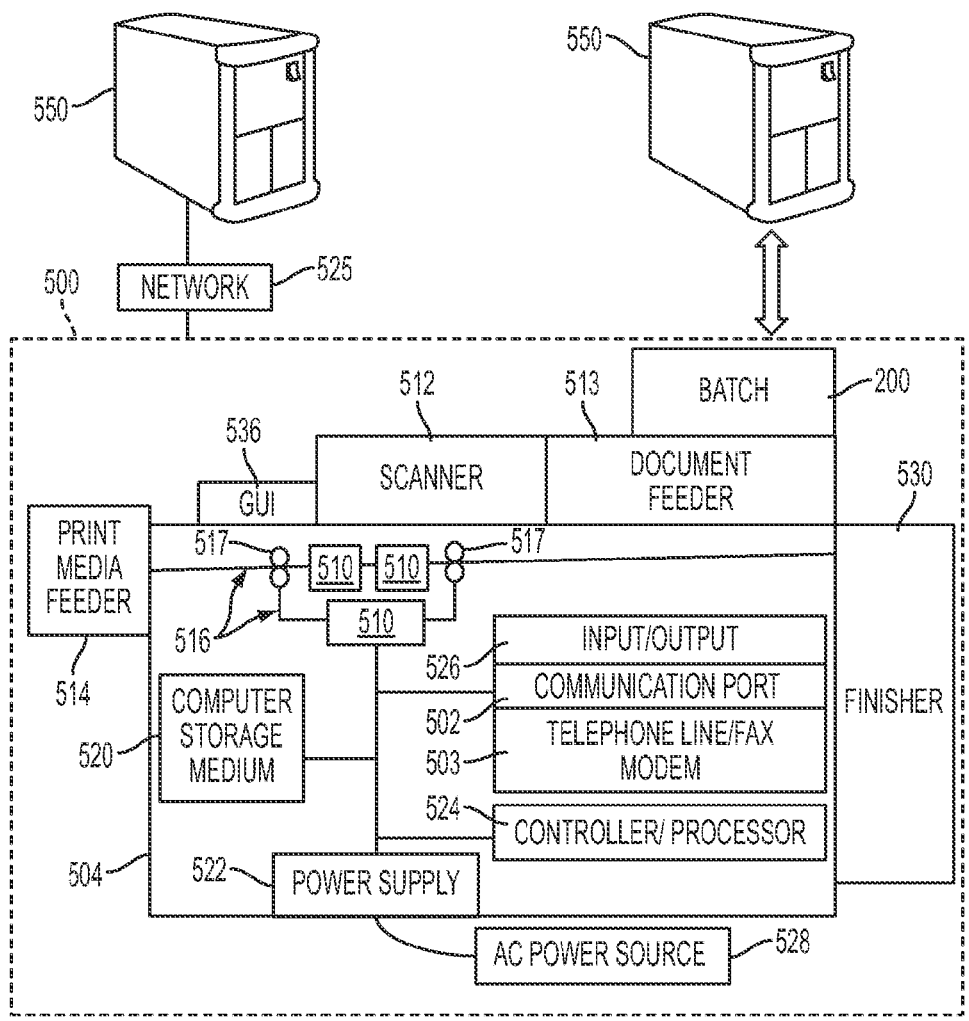
FIG. 5 is a schematic diagram illustrating an exemplary computerized scanning device for scanning in the batch of FIG. 4.

For example, referring to FIG. 5, a computerized scanning device 500, such as a multi-function printing device, that comprises an optical scanner 512 having a batch document feeder 513 can be used to scan-in a batch of media sheets, such as the batch 200 including both document sheets and separator sheets, as described in detail above and illustrated in FIG. 4. The computerized scanning device 500 and, particularly, a multi-function printing device can comprise a plurality of different functional components. These functional components can comprise, for example, an optical scanner 512 with a document feeder 513 capable of feeding a batch 200 of media sheets through the optical scanner 512, a print media feeder 514, at least one print media transport path 516 incorporating a plurality of print media transport devices 517, one or more print engines 510 (also referred to herein as printing devices, marking devices, image rendering devices, etc.) along the print media transport path 516, a finisher 530, an input/output 526, a non-transitory computer readable storage medium 520 (e.g., an optical storage medium, magnetic storage medium, capacitor-based storage medium, etc.), a graphic user interface (GUI) 536 and a digital front end (DFE) controller 524.

The DFE controller 524 (also referred to herein as DFE processor or simply as a controller) can comprise one or more computer processing units (i.e., one or more processors) that can be operatively connected to and can operatively control (e.g., can be adapted to operatively control, can be configured to operatively control, can be programmed to operatively control, etc.) the operations of the various functional components of the multi-function printing device 500, including the optical scanner 512, print media feeder 514, print media transport path(s) 516 and transport device(s) 517, print engine(s) 510, finisher 530, input/output 526, computer readable storage medium 520, graphic user interface (GUI) 536, etc. Additionally, the input/output 526 can comprise a communication port 502 as well as a telephone line/facsimile (FAX) modem 503 to allow for communication between the multi-function printing device 500 and external computerized devices (e.g., servers or computer hardware systems). For example, the multi-function printing device 500 can communicate with external computerized device(s) 550 over a wired or wireless network 525 (e.g., a local area network (LAN), wide area network (WAN), internet, etc.) and/or over the telephone line/FAX modem 503.

A scan operation can be selected by a user through the graphic user interface (GUI) 536 and, in response, the document feeder 513 can feed (i.e., can be adapted to feed, can be configured to feed, etc.) media sheets and, particularly, can feed media sheets in a single monolithic batch through the optical scanner 512. The optical scanner 512, as controlled by the DFE controller 524, can then scan-in (e.g., can be adapted to scan-in, can be configured to scan-in, etc.) the media sheets in order to produce image pages (also referred to herein as electronic or digital image pages) corresponding to the media sheets. In the present method, the user can specifically select, through the graphic user interface (GUI) 536, the use of a single page template for the scan operation such that the image pages are produced as discrete single page digital documents (i.e., also referred to herein as single page electronic documents). The resulting image pages can then be communicated over the network 525 or telephone line/FAX modem 503 to an external computerized device 550 for further storage and/or further processing.

It should be noted that in the case where the computerized scanning device 500 comprises a multi-function printing device the user can also, optionally, select, through the graphic user interface (GUI) 536, production of hardcopies (i.e., printed copies) of the media sheets in the batch 200. In this case, the print media feeder 514 can feed (e.g., can be adapted to feed, can be configured to feed, etc.) print media (e.g., paper or other print media sheets) to a print media transport path 516. The print media transport path(s) 516 and, particularly, the print media transport devices 517 incorporated therein can transport (e.g., can be adapted to transport, can be configured to transported, etc.) print media through the print engine(s) 510 and to the finisher 530. The print engine(s) 510 can print (i.e., mark) the print media as specified in a print job and can comprise, for example, single color (i.e., monochrome) and/or multi-color print engine(s) that can print (e.g., can be adapted to print, can be configured to print, etc.) in simplex format (i.e., on a single surface of a print media sheet) and/or duplex format (i.e., on opposing surfaces of a print media sheet). Following printing on the print media, the finisher 530 can cut, fold, staple, sort, and/or stack the print media.

Various different types of computerized devices including, but not limited to, multi-function printing devices, comprise optical scanners with batch document feeders. Such computerized devices are well known in the art and can be used to produce electronic image pages. Other types of computerized devices may comprise digital cameras to produce electronic image pages. Thus, the details of such computerized devices are omitted from the specification in order to allow the reader to focus on the salient aspects of the disclosed method and device.

In any case, since the media sheets within the batch 200 comprise both document sheets from the varying-length physical documents and the separator sheets 221-225 on top of the groups 201-205 of physical documents, the image pages produced from scanning-in the batch 200 of media sheets at process 112 will comprise both document sheet image pages corresponding to the document sheets and separator sheet image pages corresponding to the separator sheets.

The method and device disclosed herein relate to back-end automatic processing of these multiple image pages to form electronic documents corresponding to all the varying-length physical documents.

Figure 6:
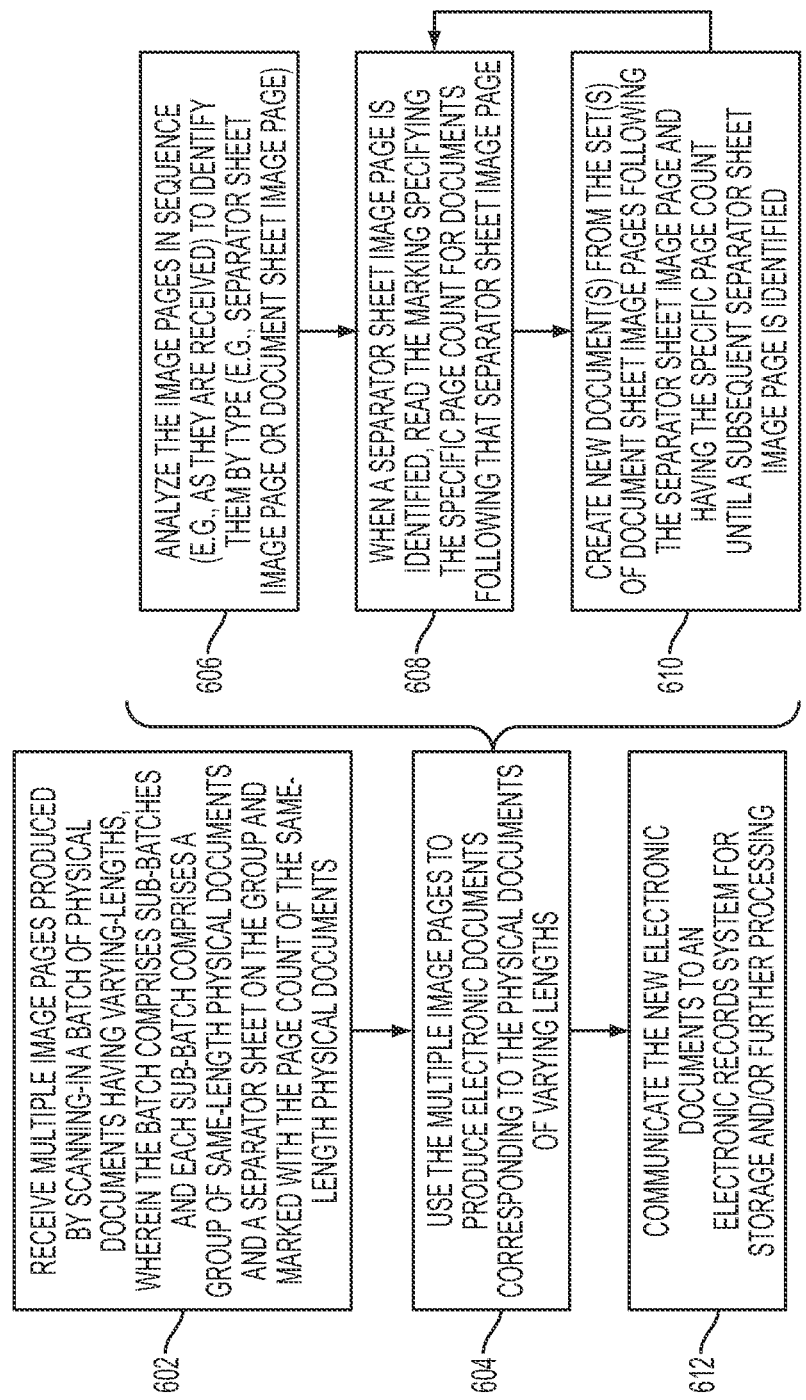
FIG. 6 is a flow diagram illustrating a method for performing back-end automatic processing of multiple image pages received following scanning-in of a batch of varying-length physical documents according to the method of FIG. 1.

Specifically, referring to FIG. 6, the method can comprise receiving (e.g., by an electronic documents processor from a computerized scanning device) multiple image pages (602).

Figure 7:
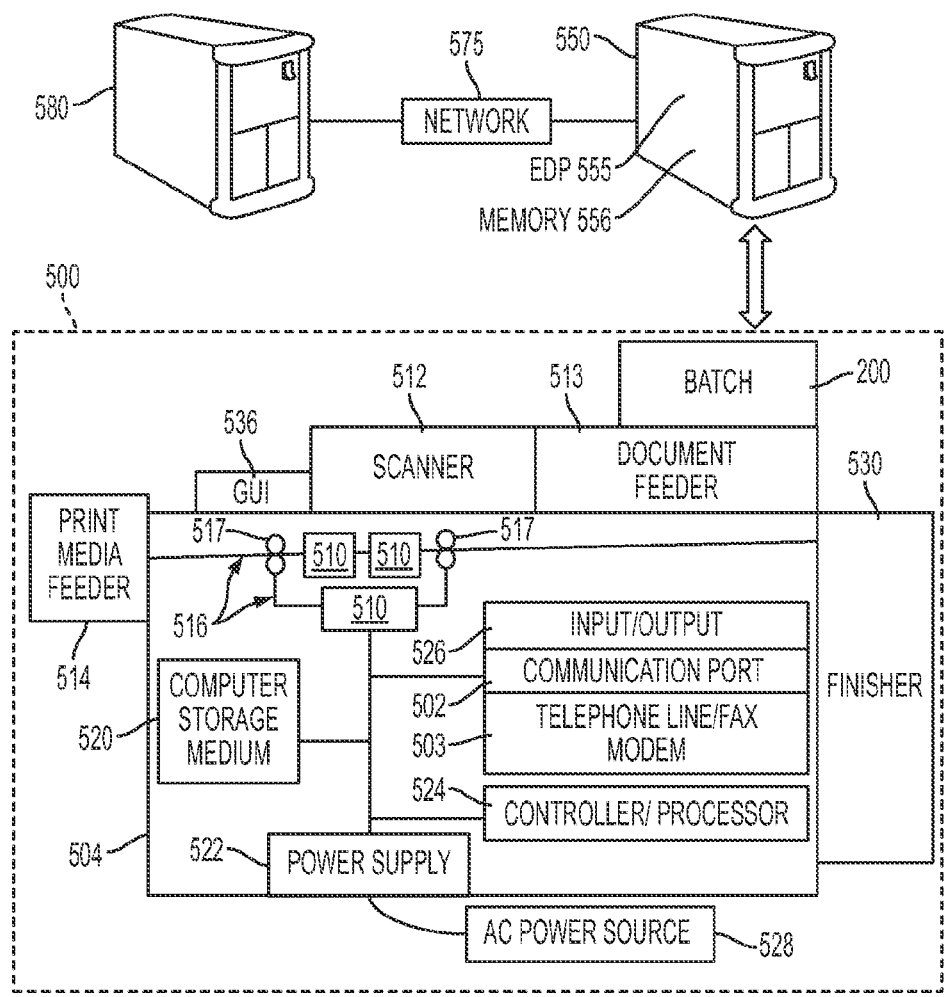
FIG. 7 is a schematic diagram illustrating communication between an electronic records system and a computerized device that performs back-end automatic processing of multiple image pages received from a computerized scanning device.

For example, referring to FIG. 7, an electronic documents processor (EDP) 555 can be incorporated into a computerized device 550 (e.g., a server or computer hardware system), which is external to a computerized scanning device 500 (e.g., a multi-function printing machine, as described above) and not connected to the same network as the computerized scanning device 500. The electronic documents processor (EDP) 555 can receive multiple image pages transmitted over a telephone line/FAX modem 503 from the computerized scanning device 500 following a scan operation wherein the computerized scanning device 500 scans-in a batch 200 of media sheets, as described in detail above and illustrated in FIG. 4. Alternatively, referring to FIG. 8, the electronic documents processor (EDP) 555 can be incorporated into a computerized device 550 (e.g., a server or computer hardware system), which is external to computerized scanning device 500 (e.g., a multi-function printing machine, as described above) and connected to the same wired or wireless network 525 as the computerized scanning device 500. This electronic documents processor (EDP) 555 can receive multiple image pages over the network 525 from a computerized scanning device (e.g., a multi-function printing machine 500) following a scan operation wherein the computerized scanning device 500 scans-in a batch 200 of media sheets, as described in detail above and illustrated in FIG. 4.

In either case, multiple image pages can be received by the electronic documents processor (EDP) 555 in the sequence in which they were scanned-in (602). Once received that can, optionally, be stored in a memory 556 of the computerized device 550).

Next, the multiple image pages can be used (e.g., by the electronic documents processor (EDP) 555) to automatically form multiple electronic documents corresponding to all of the varying-length physical documents in the batch 200 (604). Again, as mentioned above, since the media sheets within the batch 200 comprise both document sheets of the varying-length physical documents and separator sheets 221-225 on top of the groups 201-205 of physical documents, the image pages received by the electronic documents processor (EDP) 555 will comprise both document sheet image pages corresponding to the document sheets and separator sheet image pages corresponding to the separator sheets.

In order to form electronic documents corresponding to the physical documents in the batch 200 at process 604, each of the multiple image pages can be analyzed in sequence (e.g., as the multiple image pages are received by the electronic documents processor (EDP) 555 or at some later time) in order to identify the image pages by type (606). That is, the image pages can be analyzed in sequence to identify each image page as either a separator sheet image page or a document sheet image page. Identification can be made by the electronic documents processor (EDP) 555 based, for example, on the presence or absence of a page count marking (e.g., the presence or absence of a handwritten page count marking or a pre-printed page count marking, such as a pre-printed page count barcode) on the image page. Alternatively, the identification can be made by the electronic documents processor (EDP) 555 based, for example, on the presence or absence of an additional handwritten or pre-printed marking on the image page. Alternatively, the separator sheet image pages and document sheet image pages may be different sizes and, thus, can be distinguished based on these different sizes.

Additionally, the following processes can also be performed by the electronic documents processor (EDP) 555 as the image pages are being analyzed. Whenever a separator sheet image page is identified, the specific page count can be read from a marking (e.g., on barcode) on the separator sheet image page (608). For example, referring again to FIG. 3, each marking 231-235 on each separator sheet 221-225 can be in the form of text, which is handwritten or pre-printed and which indicates the specific page count for its group 201-205 of physical documents (e.g., "1-page documents", "2-page documents", etc.). This text marking can be read by an optical character recognition (OCR) tool of the electronic documents processor (EDP) 555 in order to determine the specific page count. Alternatively, each marking 231-235 on each separator sheet 221-225 can be in the form of a coded image, such as a barcode (as illustrated), which indicates the specific page count for its group 201-205 of physical documents. This coded image or barcode can be read by a code reader, such as barcode reader, of the electronic documents processor (EDP) 555 in order to determine the specific page count.

Then, electronic document(s) having the specific page count can be created from each sequential set of document sheet image pages, which follow the separator sheet image page and similarly have that specific page count (610). This process of creating the electronic document(s) with the specific page count from set(s) of document sheet image pages that follow a separator sheet image page can be performed until a subsequent separator sheet image page is identified.

For example, if the specific page count is 3, then a first set of three document sheet image pages, which immediately follow the separator sheet image page, can be extracted and used to create a first 3-page electronic document. If the image page immediately following the first set is a document sheet image page, a second set of three document sheet image pages, which immediately follow the first set, can be extracted and used to create a second 3-page electronic document. If the image page immediately following the first set is a document sheet image page, a third set of three document sheet image pages, which immediately follow the second set, can be extracted and used to create a third 3-page electronic document; and so on, until a subsequent separator sheet image page is identified (i.e., until the next separator sheet image page is identified).

Then, the processes of reading the specific page count (608) and creating electronic document(s) with that specific page count (610) can be repeated for the subsequent separator sheet image page and for each subsequent separator sheet image page identified thereafter (i.e., for all separator sheet image pages identified).

Figure 9:
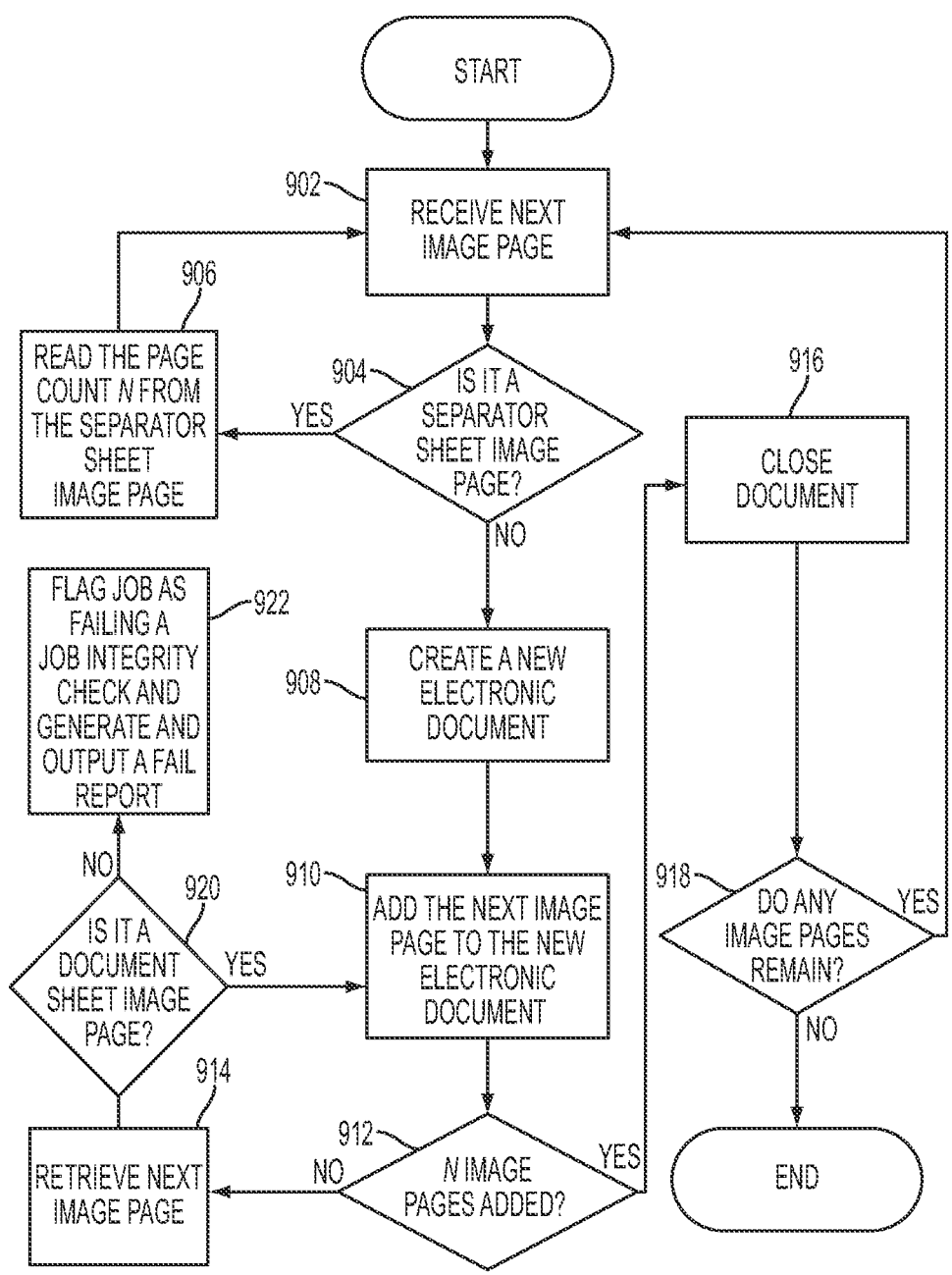
FIG. 9 is a flow diagram illustrating an exemplary technique for creating electronic documents at process 604 of FIG. 6.

FIG. 9 is a flow diagram providing a more detailed exemplary process flow that can be used by the electronic documents processor (EDP) 555 to create the electronic documents at process 604. Specifically, an image page can be received (902). This image page can then be analyzed (e.g., using the same techniques as described above) to determine whether or not it is separator sheet image page (904). If this image page is a separator sheet image page, a marking on the separator sheet image page can be read to determine the page count N (906). After the page count N is determined, the next image page can be received and a determination as to whether or not this next image page is a separator sheet image page can be made (902)-(904). If this next image page is not a separator sheet image page, a new electronic document can be created (908) and the next image page as well as each subsequent image page up to N image pages total can be added to that new electronic document (910)-(914). Once N image pages total are added to that new document, the new electronic document is complete and can be closed (916). After the new electronic document is completed and closed, a determination can be made as to whether or not any image pages remain (918). If so, the processes described above are repeated (902)-(918) are repeated.

It should be noted that, when the required N image pages have not been added to a new document at process 912 and the next image page is retrieved at process 914, the next image page can, optionally, be analyzed at process 920 before adding it to the new electronic document at process 910 to verify (i.e., confirm) that it is actually a document sheet image page as opposed to a separator sheet image page. If the next image page is a document sheet image page as expected, it will be added to the new electronic document at process 910. However, if the next image page is not (i.e., if it is a separator sheet image page), the job can be automatically flagged as failing a job integrity check (922). Alternatively, a determination can be made as to whether or not the number of image pages between a separate sheet image page and the next separator sheet image page is divisible by the required page count N. If not, the job can be automatically flagged as failing a job integrity check. When a job is flagged as failing a job integrity check, a fail report can generated (e.g., automatically or on-demand) and that report can be output (e.g., to the device from which the image pages were received).

Referring again to FIG. 6, the method can further comprise communicating the multiple electronic documents to an electronic records system for storage and/or further processing either automatically as the electronic documents are generated or upon request (612).

For example, as illustrated in FIG. 7, the electronic documents processor (EDP) 555 can be incorporated into a computerized device 550 (e.g., a server or computer hardware system) that is on (i.e., connected to) the same network 575 as an electronic records system 580. In this case, the process of communicating the multiple electronic documents can be performed by the electronic documents processor (EDP) 555 automatically over that same network 575 as each new electronic document is created, thereby avoiding any proprietary changes in the code used by the electronic records system 580. In other words, electronic record system protocols that already exist to enable scanners to transmit electronic documents (e.g. TIFF or PDF) directly into the electronic records system can be leveraged when the computerized device 550 and electronic records system 580 are on the same network 575 so that no changes in the proprietary software of the electronic records system 580 is needed.

Figure 8:
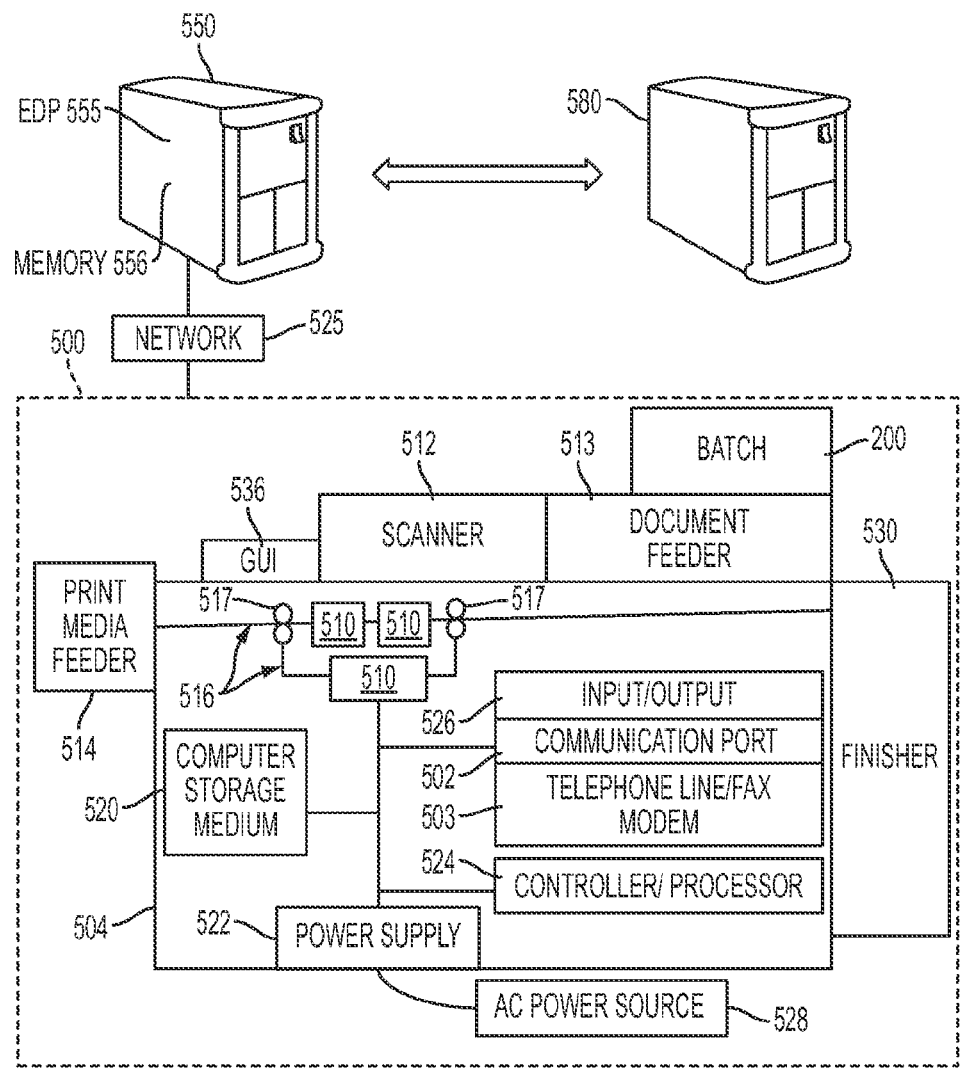
FIG. 8 is an alternative schematic diagram illustrating communication between an electronic records system and a computerized device that performs back-end automatic processing of multiple image pages received from a computerized scanning device.

Alternatively, as illustrated in FIG. 8, the electronic documents processor (EDP) 555 can be incorporated into a computerized device 550 (e.g., a server or computer hardware system) that is not on (i.e., not connected to) the same network as the electronic records system 580. In this case, a polling request may be used to initiate on-demand communication of the multiple electronic documents to the electronic records system 580. Specifically, in this case, the multiple electronic documents can initially be stored by the electronic documents processor (EDP) 555 in a memory 556 of the external computerized device 550. When a polling request for any new electronic documents is received by the computerized device 550 from a software agent of an electronic records system 580, the software agent can be allowed by the external computerized device 550 to download the multiple electronic documents from the memory 556 to the electronic records system 580, thereby also avoiding any proprietary changes in the code used by the electronic records system 580.

Figure 10:
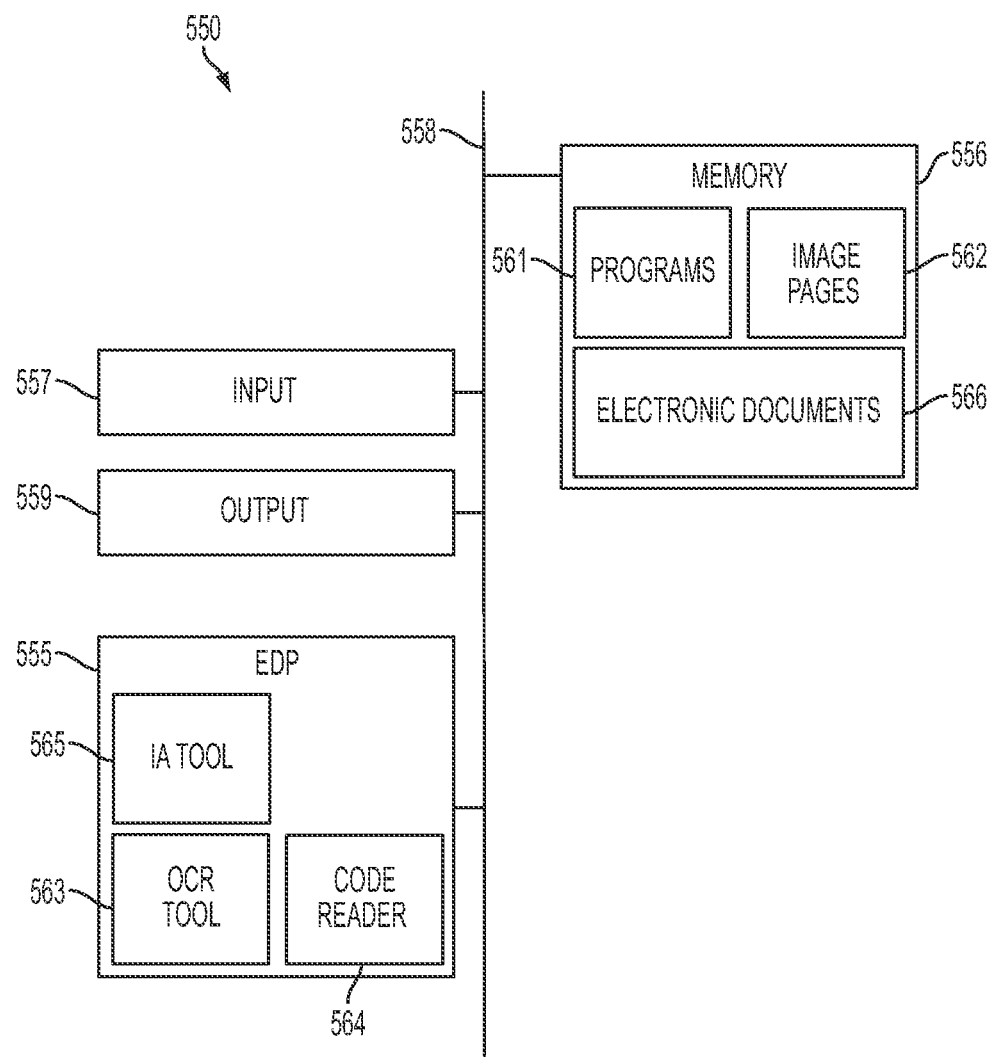
FIG. 10 is schematic diagram illustrating a computerized device for performing back-end automatic processing of multiple image pages received from a computerized scanning device.

Also, referring to FIG. 10, disclosed herein is a computerized device 550 (e.g., a server or a computer hardware system) for electronic document processing.

It should be noted that prior to any electronic document processing by the device 550, a batch of media sheets can be formed (e.g., in the manner set forth in the flow diagram of FIG. 1). Specifically, this batch 200 can be formed in the manner set forth in the flow diagram of FIG. 1 so that it comprises a plurality of sub-batches 241-245, as illustrated in FIG. 4. The sub-batches 241-245 can comprise groups 201-205 of physical documents comprising document sheets, wherein some or all of the groups 201-205 comprise multiple multi-page physical documents and the multiple multi-page physical documents in any given group each have the same page count (i.e., the same length) (e.g., see 2-page documents 212*a-c* of group 202, 3-page physical documents 213*a-b* of group 203, and so on). The sub-batches 241-245 can also comprise separator sheets 221-225 (also referred to as separators, divider sheets, dividers, slip sheets, inserts, etc.) on top of the groups 201-205 and these separator sheets 221-225, as shown in FIG. 3, can have markings 231-235 indicating the page counts associated with the groups 201-205. That is, each separator sheet 221-225 can have a marking indicating the page count of any physical documents contained in its group 201-205. The markings 231-235 on the separator sheets 221-225 can be handwritten or pre-printed and can be text or code images (e.g., barcodes). Optionally, no groups will have the same corresponding page count (i.e., no two groups will contain physical documents of the same length) such that the page counts marked on the different separator sheets will all be different.

In any case, this batch 200 can then be scanned-in to produce multiple image pages. Specifically, the batch 200 of media sheets can be scanned-in using any computerized scanning device 500 (e.g., a multi-function printing device as shown in FIG. 5) that incorporates or is operatively connected to an optical scanner having a batch document feeder. Since the media sheets within the batch 200 comprise both the document sheets from the various physical documents contained in the groups as well as the separator sheets on top of each group, the image pages produced from scanning-in the batch of media sheets will comprise both document sheet image pages corresponding to the document sheets and separator sheet image pages corresponding to the separator sheets.

Figure 11:
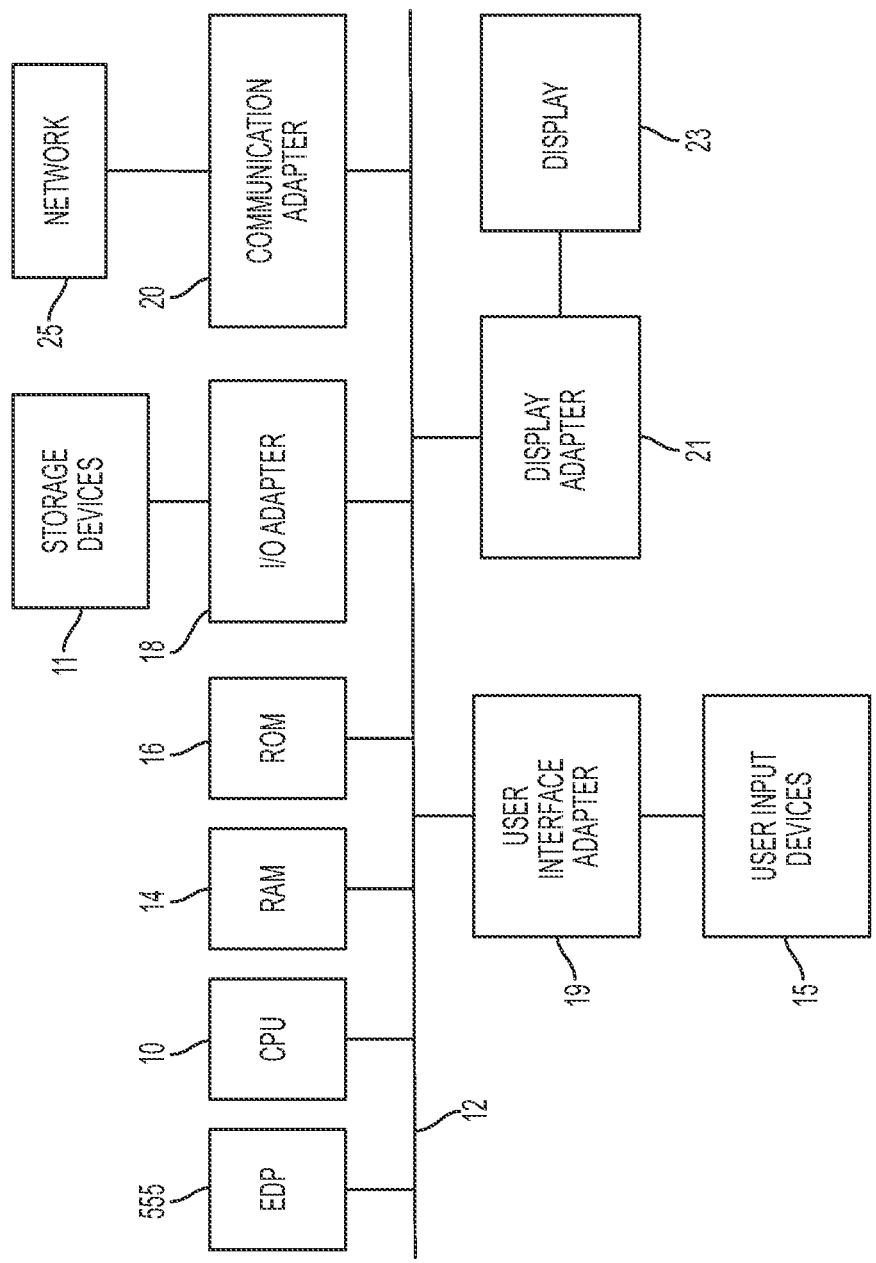
FIG. 11 is a schematic diagram illustrating an exemplary hardware configuration for implementing the disclosed method and device.

The computerized device 550 can comprise a server or computer hardware system. For example, as illustrated in FIG. 11, the computerized device 550 can comprise at least one processor or central processing unit (CPU) 10, including an electronic documents processor (EDP) 555. The CPUs 10, including the electronic documents processor (EDP) 555, can be interconnected via a system bus 12 to various device components such as a random access memory (RAM) 14, read-only memory (ROM) 16, and an input/output (I/O) adapter 18. The I/O adapter 18 can peripheral storage devices 11 to the system bus 12. The peripheral storage devices 11 can comprise data and/or program storage devices, which are readable by the computerized device 550 and, particularly, the CPUs 10, including the electronic documents processor (EDP) 555. The CPUs 10, including the electronic documents processor (EDP) 555, can read data and inventive programs stored on the storage devices 11 and can execute the instructions to perform the disclosed method. Optionally, the computerized device 550 can further comprise a user interface adapter 19 that connects user input devices 15 (e.g., a keyboard, mouse, microphone, etc.) to the system bus 12. The computerized device 550 can also comprise a communication adapter 20, which connects the system bus 12 to a network 25, and a display adapter 21, which connects the system bus 12 to a display device 23 which may be embodied as an output device such as a monitor, printer, or transmitter, for example.

In any case, referring again to FIG. 10, this computerized device 550 can comprise at least an input 557, an output 559, a memory 556 and an electronic documents processor (EDP) 555 operatively connected to the input 557, output 559 and memory 556 (e.g., via a system bus 558).

The input 557 can receive (i.e., can be adapted to receive, can be configured to receive, etc.) the multiple image pages in sequence from the computerized scanning device 500. Optionally, the multiple image pages can be stored in memory 556 (e.g., see stored image pages 562). The electronic documents processor (EDP) 555 can use these multiple image pages to form multiple electronic documents corresponding to all of the varying-length physical documents in the batch 200.

The electronic documents processor (EDP) 555 can analyze (i.e., can be adapted to analyze, can be configured to analyze, can read and execute a program of instructions 561 stored in the memory 556 in order to analyze, etc.) the multiple image pages in sequence in order to identify the image pages by type (e.g., as a separator sheet image page or as a document sheet image page). It should be noted that the electronic documents processor (EDP) 555 can automatically analyze the image pages in sequence as each image page is received at the input 557. Alternatively, as mentioned above, the multiple image pages can initially be stored in the memory 556 (see stored image pages 562). In this case, the electronic documents processor (EDP) 555 can, in response to a demand, request or some other triggering condition, access the stored image pages 562 and analyze them in sequence.

Specifically, the electronic documents processor (EDP) 555 can comprise an image analysis (IA) tool 565 that identifies (i.e., is adapted to identify, is configured to identify, reads and executes a program of instructions 561 stored in memory 556 to identify, etc.) an image page as a separator sheet image page or a document sheet image page based, for example, on the presence or absence, respectively, of a page count marking (e.g., the presence or absence of a handwritten page count marking or a pre-printed page count marking, such as a pre-printed page count barcode) on the image page. Alternatively, the image analysis (IA) tool 565 can identify (i.e., can be adapted to identify, can be configured to identify, can read and execute a program of instructions 561 stored in memory 556 to identify, etc.) an image page as a separator sheet image page or a document sheet image page based, for example, on the presence or absence, respectively, of an additional handwritten or pre-printed marking on the image page. Alternatively, the image analysis (IA) tool 565 can identify (i.e., can be adapted to identify, can be configured to identify, can read and execute a program of instructions 561 stored in memory 556 to identify, etc.) an image page as a separator sheet image page or a document sheet image page based, for example, on the presence or absence, respectively, based on the different sizes of such image pages.

Additionally, as the electronic documents processor (EDP) 555 analyzes the image pages in sequence, it can further perform (i.e., be adapted to perform, be configured to perform, read and execute a program of instructions 561 stored in memory 556 to perform, etc.) the following processes. When a separator sheet image page is identified, the electronic documents processor (EDP) 555 can read the specific page count can from a marking (e.g., a text marking or coded image marking, such as a barcode) on that separator sheet image page. For example, the electronic documents processor (EDP) 555 can comprise an optical character recognition (OCR) tool 563. When the markings 531-535 on the separator sheets 521-525, as discussed above and illustrated in FIG. 3, comprise handwritten or pre-printed text markings, this optical character recognition (OCR) tool 563 can recognize (i.e., can be adapted to recognize, can be configured to recognize, can read and execute a program of instructions 561 store in memory 556 to recognize, etc.) the specific page count on the separator sheet image page. Additionally or alternatively, the electronic documents processor (EDP) 555 can comprise a code reader 564 (e.g., a barcode reader). When the markings 531-535 on the separator sheets 521-525, as discussed in detail above and illustrated in FIG. 3, comprise coded image markings (e.g., barcodes), this code reader 564 (e.g., barcode reader) can read the coded image (i.e., can be adapted to read, can be configured to read, can read and execute a program of instructions 561 stored in memory 556 to read, etc.) the specific page count on the separator sheet image page.

The electronic documents processor (EDP) 555 can further create (i.e., can be adapted to create, can be configured to create, can read and execute a program of instructions 561 stored in memory 556 to create, etc.) electronic document(s) having that specific page count from each sequential set of document sheet image pages, which follow the separator sheet image page and similarly have that specific page count. The electronic documents processor (EDP) 555 can create electronic document(s) with the specific page count from set(s) of document sheet image pages that follow a separator sheet image page until it identifies a subsequent separator sheet image page (i.e., until it next identifies a separator sheet image page).

For example, if the electronic documents processor (EDP) 555 reads a specific page count of 3 off a separator sheet image page, then the electronic documents processor (EDP) 555 can extract a first set of three document sheet image pages, which immediately follow the separator sheet image page, and use that first set to create a first 3-page electronic document. If the electronic documents processor (EDP) 555 determines that the image page following the first set is a document sheet image page, the electronics document processor (EDP) 555 can extract a second set of three document sheet image pages, which immediately follow the first set, and use that second set to create a second 3-page electronic document. If the electronic documents processor (EDP) 555 determines that the image page following the second set is a document sheet image page, the electronics document processor (EDP) 555 can extract a third set of three document sheet image pages, which immediately follow the second set, and use that third set to create a third 3-page electronic document; and so on, until a subsequent separator sheet image page is identified (i.e., until the next separator sheet image page is identified).

The electronic documents processor (EDP) 555 can repeat (i.e., can be adapted to repeat, can be configured to repeat, can read and execute a program of instructions 561 stored in memory 556 to repeat, etc.) the processes of reading the specific page count and creating electronic document(s) with that specific page count for the subsequent separator sheet image page and for each subsequent separator sheet image page identified thereafter (i.e., for all separator sheet image pages identified).

It should be noted that the EDP 555 verify (i.e., confirm) (i.e., can be adapted to verify, can be configured to verify, etc.) that image pages extracted to create new electronic documents are document sheet image pages as expected given the specified page count. If an image page in a given set of image pages extracted to create new electronic document is not a document sheet image page, but rather a separator sheet image page, the EDP 555 can automatically flag the job as failing a job integrity check. Alternatively, the EDP 555 can determine (i.e., can be adapted to determine, can be configured to determine, etc.) whether or not the number of image pages between a separate sheet image page and the next separator sheet image page is divisible by the required page count. If not, the EDP 555 can automatically flag the job as failing a job integrity check.

The computerized device 550 can further comprise an output 559 that can communicate (i.e., can be adapted to communicate, can be configured to communicate, can read and execute a program of instructions 561 stored in memory 556 to communicate, etc.) the multiple electronic documents to an electronic records system for storage and/or further processing. Such communication can be either automatic as the electronic documents are created or can be only in response to a demand, request or other triggering condition.

For example, as illustrated in FIG. 7, the computerized device 550 can be on (i.e., connected to) the same wired or wireless network 575 as the electronic records system 580. In this case, the multiple electronic documents can be communicated automatically over that same network 575 to the electronic records system as they are created by the electronic documents processor 555, thereby avoiding any proprietary changes in the code used by the electronic records system. In other words, electronic record system protocols that already exist to enable scanners to transmit electronic documents (e.g. TIFF or PDF) directly into the electronic records system can be leveraged when the computerized device 550 and electronic records system 580 are on the same network 575 so that no changes in the proprietary software of the electronic records system 580 is needed.

Alternatively, as illustrated in FIG. 8, the computerized device 550 can be one (i.e., connected to) a different network than the electronic records system 580. For example, the computerized device 550 can be on (i.e., connected to) the same network 525 as the computerized scanning device 500 that produces the multiple image pages. In this case, the electronic documents processor (EDP) 555 can initially store the multiple electronic documents in the memory 556 (e.g., see stored electronic documents 566). The computerized device 550 can subsequently receive a polling request for any new electronic documents from a software agent of the electronic records system 580. In response to this polling request, the computerized device 550 can allow the software agent to download the stored electronic documents 566 from the memory 556 to the electronic records system 580, thereby also avoiding any proprietary changes in the code used by the electronic records system.

It should be noted that in the case where the EDP 555 flags a job as failing a job integrity check, the EDP 555 can further generate (i.e., can be adapted to generate, can be configured to generate, etc.) a fail report and the output 559 can communicate that fail report (e.g., to the device from which the image pages were received).

It should be noted that in the method and device described above the computerized scanning device can be either a simplex or duplex scanning device. Those skilled in the art will recognize that, for duplex scanning, the specified page count marked on the separator sheets must correspond to the actual page count and not the document sheet count. Alternatively, for duplex scanning, the specific page count marked on the separator sheets can correspond to the document sheet count; however, for purposes of extracting the image pages and creating the electronic documents, this specified page count must be multiplied by two.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

Therefore, disclosed above are an electronic documents processing method and device wherein electronic documents are automatically created from a batch of physical documents of varying lengths. Specifically, the batch comprises sub-batches of groups of multiple multi-page physical documents of varying lengths with separator sheets on each group. Each separator sheet is marked with the page count of any physical documents contained in its group. The batch is scanned-in and the resulting image pages are used to form the electronic documents. Specifically, the image pages are analyzed in sequence to identify document sheet image pages and separator sheet image pages. When a separator sheet image page is identified, the specific page count on that separator sheet image page is read and electronic document(s) is/are created from sequential set(s) of document sheet image pages, which follow the separator sheet image page and have the specific page count, until the next separator sheet image page is identified. This is repeated for all separator sheet image pages identified.

It should be noted that the method and device described above eliminates the need to perform manual back end processing of electronic documents. It also eliminates the need to sort physical documents into discrete batches according to page length for scanning in purposes and/or the need to insert separator sheets (i.e., slip sheets) in between each physical document when scanning in a batch of multi-length physical documents. Thus, the method and device provide a significant time saving advantage over previously used methods and devices for creating electronic documents from physical documents of varying lengths.

What is claimed is:
1. A method comprising:
receiving, by an electronic documents processor of a computerized device, multiple image pages produced by scanning a batch of media sheets,
said batch comprising a plurality of sub-batches,
said sub-batches comprising:
groups of physical documents comprising document sheets, wherein at least some of said groups comprise multiple physical documents and each of said multiple physical documents in a given group have a same page count; and
separator sheets on top of said groups, said separator sheets having markings indicating page counts associated with said groups, and
said multiple image pages comprising document sheet image pages corresponding to said document sheets and separator sheet image pages corresponding to said separator sheets; and
forming, by said electronic documents processor, multiple electronic documents corresponding to all physical documents in said batch, said forming being performed by analyzing each of said multiple image pages in sequence to identify page type and, during said analyzing, performing the following:
when a separator sheet image page is identified, reading a specific page count from a marking on said separator sheet image page;
creating an electronic document having said specific page count from each sequential set of document sheet image pages following said separator sheet image page and having said specific page count, said creating being performed until a subsequent separator sheet image page is identified; and
repeating said reading and said creating for all separator sheet image pages identified.

2. The method of claim 1, said multiple physical documents each comprising multi-page physical documents.

3. The method of claim 1, said page counts being different on each of said separator sheets.

4. The method of claim 1, said markings being any one of pre-printed markings and handwritten markings.

5. The method of claim 1, further comprising automatically communicating, by an output of said computerized device, said multiple electronic documents to an electronic records system over a network connected to both said computerized device and said electronic records system.

6. The method of claim 1, further comprising:
storing, in a memory of said computerized device, said multiple electronic documents;
receiving, by said computerized device from a software agent of an electronic records system, a polling request for any new electronic documents; and
after said receiving of said polling request, allowing, by said computerized device, said software agent to download said multiple electronic documents to said electronic records system.

7. The method of claim 1, further comprising:
automatically performing job integrity checks by performing any one of the following:
verifying that each image page placed in a new electronic document is a document sheet image page; and
determining that a number of image pages between said separator sheet image page and said subsequent separator sheet image page is divisible by said specific page count.

8. A method comprising:
receiving, by an electronic documents processor of a computerized device, multiple image pages produced by scanning a batch of media sheets using a single page template,
said batch comprising a plurality of sub-batches, said sub-batches comprising:
   groups of physical documents comprising document sheets, wherein at least some of said groups comprise multiple physical documents and each of said multiple physical documents in a given group have a same page count; and
   separator sheets on top of said groups, said separator sheets having barcodes indicating page counts associated with said groups, and
said multiple image pages comprising document sheet image pages corresponding to said document sheets and separator sheet image pages corresponding to said separator sheets; and
forming, by said electronic documents processor, multiple electronic documents corresponding to all physical documents in said batch, said forming being performed by analyzing each of said multiple image pages in sequence, as said multiple image pages are received by said electronic documents processor, to identify page type and, during said analyzing, performing the following:
   when a separator sheet image page is identified, reading a specific page count from a barcode on said separator sheet image page;
   creating an electronic document having said specific page count from each sequential set of document sheet image pages identified following said separator sheet image page and having said specific page count, said creating being performed until a subsequent separator sheet image page is identified; and
   repeating said reading and said creating for all separator sheet image pages identified.

9. The method of claim 8, said multiple physical documents each comprising multi-page physical documents.

10. The method of claim 8, said page counts being different on each of said separator sheets.

11. The method of claim 8, further comprising automatically communicating, by an output of said computerized device, said multiple electronic documents to an electronic records system over a network connected to both said computerized device and said electronic records system.

12. The method of claim 8, further comprising:
storing, in a memory of said computerized device, said multiple electronic documents;
receiving, by said computerized device from a software agent of an electronic records system, a polling request for any new electronic documents; and
after said receiving of said polling request, allowing, by said computerized device, said software agent to download said multiple electronic documents to said electronic records system.

13. The method of claim 8, further comprising:
automatically performing job integrity checks by performing any one of the following:
   verifying that each image page placed in a new electronic document is a document sheet image page; and
   determining that a number of image pages between said separator sheet image page and said subsequent separator sheet image page is divisible by said specific page count.

14. A computerized device comprising:
an input receiving multiple image pages; and
an electronic documents processor operatively connected to said input,
   said multiple image pages produced by scanning a batch of media sheets,
   aid batch comprising a plurality of sub-batches,
   said sub-batches comprising:
      groups of physical documents comprising document sheets, wherein at least some of said groups comprise multiple physical documents and each of said multiple physical documents in a given group have a same page count; and
      separator sheets on top of said groups, said separator sheets having markings indicating page counts associated with said groups, and
   said multiple image pages comprising document sheet image pages corresponding to said document sheets and separator sheet image pages corresponding to said separator sheets,
   said electronic documents processor further forming multiple electronic documents corresponding to all physical documents in said batch by analyzing each of said multiple images pages in sequence to identify page type and, during said analyzing, performing the following:
      when a separator sheet image page is identified, reading a specific page count from a marking on said separator sheet image page;
      creating an electronic document having said specific page count from each sequential set of document sheet image pages following said separator sheet image page and having said specific page count, said creating being performed until a subsequent separator sheet image page is identified; and
      repeating said reading and said creating for all separator sheet image pages identified.

15. The computerized device of claim 14, said multiple physical documents each comprising multi-page physical documents.

16. The computerized device of claim 14, said page counts being different on each of said separator sheets.

17. The computerized device of claim 14, said markings being any one of pre-printed markings and handwritten markings.

18. The computerized device of claim 14, further being connected by a network to an electronic records system and further comprising an output automatically communicating said multiple electronic documents to said electronic documents processor over said network.

19. The computerized device of claim 14, further comprising a memory,
said electronic documents processor storing said multiple electronic documents in said memory, and
said computerized device receiving a polling request for any new electronic documents from a software agent of an electronic records system and, after said receiving of said polling request, allowing said software agent to download said multiple electronic documents to said electronic records system.

20. A computerized device comprising:
an input receiving multiple image pages; and
an electronic documents processor operatively connected to said input,
   said multiple image pages produced by scanning a batch of media sheets using a single page template,
   said batch comprising a plurality of sub-batches,
   said sub-batches comprising:
      groups of physical documents comprising document sheets, wherein at least some of said groups comprise multiple physical documents and each of said multiple physical documents in a given group have a same page count; and separator sheets on top of said groups, said separator sheets having barcodes indicating page counts associated with said groups, and said multiple image pages comprising document sheet image pages corresponding to said document sheets and separator sheet image pages corresponding to said separator sheets, said electronic documents processor further forming multiple electronic documents corresponding to all physical documents in said batch by analyzing each of said multiple image pages in sequence, as said multiple image pages are received by said electronic documents processor, to identify page type and, during said analyzing, performing the following:

when a separator sheet image page is identified, reading a specific page count from a barcode on said separator sheet image page;

creating an electronic document having said specific page count from each sequential set of document sheet image pages identified following said separator sheet image page and having said specific page count, said creating being performed until a subsequent separator sheet image page is identified; and repeating said reading and said creating for all separator sheet image pages identified.

21. The computerized device of claim 20, said multiple physical documents each comprising multi-page physical documents.

22. The computerized device of claim 20, said page counts being different on each of said separator sheets.

23. The computerized device of claim 20, further being connected by a network to an electronic records system and further comprising an output automatically communicating said multiple electronic documents to said electronic documents processor over said network.

24. The computerized device of claim 20, further comprising a memory, said electronic documents processor storing said multiple electronic documents in said memory, and said computerized device receiving a polling request for any new electronic documents from a software agent of an electronic records system and, after said receiving of said polling request, allowing said software agent to download said multiple electronic documents to said electronic records system.

* * * * *